UNITED STATES PATENT OFFICE.

JAMES EDWARD SOUTHCOMBE, OF BIRKENHEAD, ENGLAND.

MEANS FOR COOLING AND LUBRICATING ENGINES.

1,304,399.      Specification of Letters Patent.      Patented May 20, 1919.

No Drawing.      Application filed February 25, 1919. Serial No. 279,219.

*To all whom it may concern:*

Be it known that I, JAMES EDWARD SOUTHCOMBE, subject of the King of Great Britain, residing at Birkenhead, in the county of Chester and Kingdom of England, have invented certain new and useful Improvements in Means for Cooling and Lubricating Engines, of which the following is a specification.

It has previously been proposed to cool the combustion chamber of internal combustion engines by injecting water into the inside of the cylinder. Although such internal cooling presents the possibility of considerable advantages in comparison with the method of externally cooling the walls, there are numerous attendant difficulties.

For example, it has been found that when the cylinder walls are cooled with a spray of pure water, there is great difficulty in maintaining the oil film, with the result that lubrication is very inefficient and difficult. Further, the products of combustion contain sometimes acid substances such as sulfur dioxid formed from the sulfur present in the gas or other fuel, acetic acid from alcohol or other organic matter. These acid substances dissolving in the cooling water cause serious corrosion of the cylinder and working parts.

Now my invention consists in employing as an internal cooling medium, a dilute emulsion of water and oil, *i. e.* an emulsion in which water is in large excess. By this arrangement the cooling is effected at the desired point, viz:—, the internal wall of the cylinder, and in addition the oil liberated by the breaking up of part of the emulsion acts as a lubricant.

In practice I have found that an emulsion containing from 90 to 95% of water has the desired effect. The quantity of emulsion used or circulated per minute differs with various types of prime movers, but the feed can readily be adjusted to suit every individual case.

Furthermore, as the products of combustion usually contain acid substances of a deleterious character, I prefer to employ an emulsion containing basic substances such as caustic soda, potash or ammonia, so that the acid combustion products may be neutralized, and thus such corrosion of the metal as would otherwise take place is prevented.

As an example I may employ an emulsion made from mineral oil 85 parts, rosin 5 parts, fatty acids 3 parts and 1250 parts of water, the whole being rendered faintly alkaline by aqueous caustic soda, potash or ammonia.

In cases where an excess of emulsion is employed, that portion of the aqueous emulsion which escapes volatilization may be recovered and circulated through an external cooling device.

I declare that what I claim is:—

The process of cooling the interior of walls of internal combustion engines, which comprises introducing into the cylinder a dilute alkaline water emulsion of oil containing at least 90% of water.

In witness whereof, I have hereunto signed my name this 7th day of Feb. 1919, in the presence of two subscribing witnesses.

JAMES EDWARD SOUTHCOMBE.

Witnesses:
W. H. BEESTON,
J. MCLACHLAN.